F. O. JAQUES, Jr.
DENTAL PRESS.
APPLICATION FILED MAR. 28, 1911.

1,013,940.

Patented Jan. 9, 1912.
2 SHEETS—SHEET 1.

WITNESSES:
Julia Ricci
Harry G Jones.

INVENTOR:
Fernando Oscar Jaques, Jr.,
by Chas. H. Luther
ATTORNEY.

F. O. JAQUES, Jr.
DENTAL PRESS.
APPLICATION FILED MAR. 28, 1911.
1,013,940.
Patented Jan. 9, 1912.
2 SHEETS—SHEET 2.
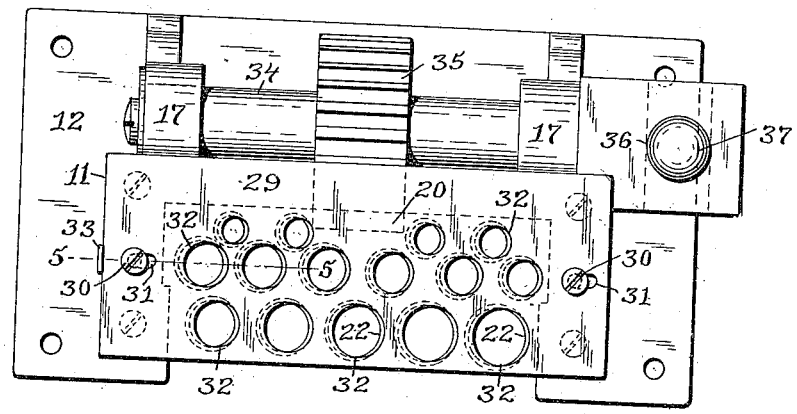
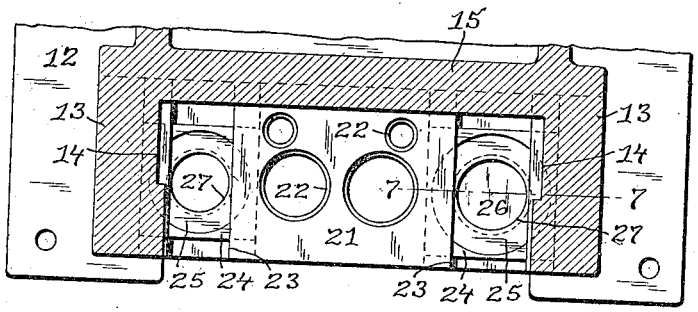
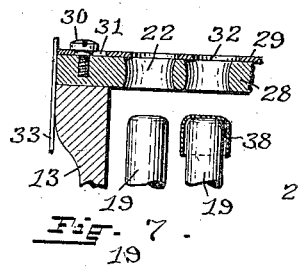
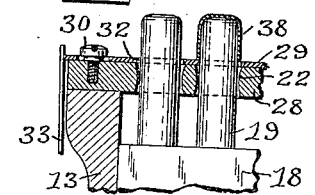
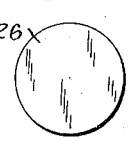
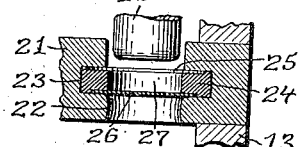
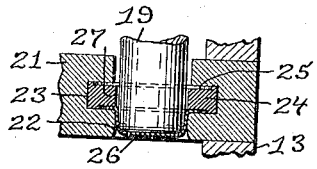
WITNESSES:
Julia Ricci
Harry G. Jones.
INVENTOR:
Fernando Oscar Jaques, Jr.,
by Chas. H. Luther
ATTORNEY.

UNITED STATES PATENT OFFICE.

FERNANDO OSCAR JAQUES, JR., OF CRANSTON, RHODE ISLAND, ASSIGNOR TO THE CENTRAL TOOL COMPANY, OF PROVIDENCE, RHODE ISLAND, A CORPORATION OF RHODE ISLAND.

DENTAL PRESS.

1,013,940. Specification of Letters Patent. Patented Jan. 9, 1912.

Application filed March 28, 1911. Serial No. 617,420.

*To all whom it may concern:*

Be it known that I, FERNANDO OSCAR JAQUES, Jr., a citizen of the United States, residing at Cranston, in the county of Providence and State of Rhode Island, have invented a new and useful Improvement in Dental Presses, of which the following is a specification.

This invention has reference to an improvement in dental implements and more particularly to an improvement in dental presses for forming dental crown shells and similar articles from sheet metal blanks.

In the use of dental presses as heretofore constructed, there is usually considerable loss in stock and time, caused by the edges of the flat blank buckling and cracking, in the first step in forming up a shell from the blank, thereby forming imperfect shells, also the usual dental presses having a plurality of plungers, are comparatively complicated and expensive to manufacture. Furthermore in the usual dental press the construction of the die plates is such that the crown shells are usually obliged to be removed from the end of the plungers by hand, which is extremely difficult and causes loss of time in the operation of the press.

The object of my invention is to improve the construction of a dental press, whereby the operation of forming crown shells is greatly facilitated, a more perfect crown shell obtained, the crown shells automatically removed from the plungers, the construction simplified, and the cost of manufacturing the press reduced.

My invention consists in the peculiar and novel construction of a dental press having details of construction, as will be more fully set forth hereinafter and claimed.

Figure 1:
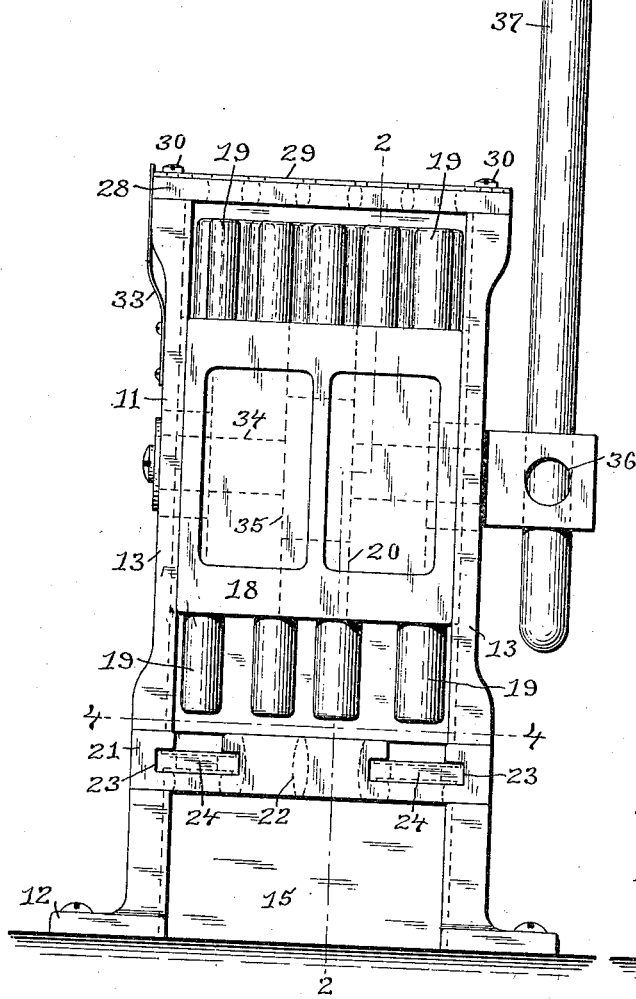
Figure 2:
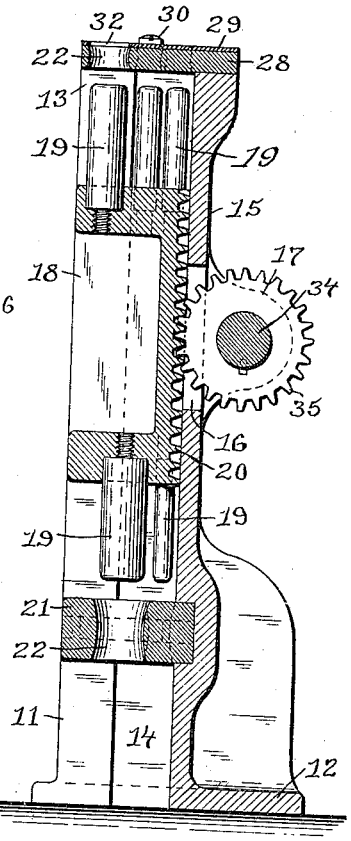

Figure 1 is a vertical front view of my improved dental press showing the slide in an intermediate position. Fig. 2 is a vertical sectional view taken on line 2—2 of Fig. 1 through the press. Fig. 3 is an enlarged top plan view of the press. Fig. 4 is a transverse sectional view through the press, taken on line 4—4 of Fig. 1. Fig. 5 is a detail vertical sectional view taken on line 5—5 of Fig. 3, illustrating the operation of the upper plungers. Fig. 6 is a detail sectional view similar to Fig. 5, still further illustrating the operation of the upper plungers. Fig. 7 is a detail vertical sectional view taken on line 7—7 of Fig. 4, illustrating the operation of forming a crown shell from a flat blank. Fig. 8 is a detail sectional view similar to Fig. 7, still further illustrating the operation of forming a crown shell from a flat blank. Fig. 9 is a face view of one of the blank-holding members; and Fig. 10 is a face view of a flat metal blank in the form of a disk.

My improved dental press comprises, as shown in the drawings, a frame 11 having a base 12, vertical sides 13, 13 in which are vertical guide-ways 14, 14, a back 15 in which is a central opening 16, and two horizontal bearings 17, 17 on the back, all formed integral. A slide 18. has a sliding fit in the guide-ways 14. 14. and a vertical rack 20. is formed centrally in the back of the slide, in alinement with the opening 16. in the back of the frame. A plurality of cylindrical plungers 19. 19. of graduated diameters are secured to and extend vertically upward from the top of the slide; and a plurality of cylindrical plungers 19. 19. of graduated diameters, are secured to and extend vertically downward from the bottom of the slide.

A lower horizontal die plate 21. is secured in the frame 11. below the slide 18. and provided with a plurality of drawing holes 22. 22. corresponding in size to and in axial alinement with the lower plungers 19. 19., and having a transverse undercut slot 23. which extends from the front to the back, at each end of the die plate, under the end plungers 19. 19. and over the end drawing holes 22. 22. Blank holding members 24. 24. are shaped to have a sliding fit in each of the slots 23. 23., a shallow circular depression 25. being in each face, for a sheet metal blank 26., as shown in Fig. 9, and a central hole 27. for a plunger 19.

An upper horizontal die plate 28. is secured to the top of the frame 11. above the slide 18. and provided with a plurality of drawing holes 22. 22. corresponding in size to and in axial alinement with the upper plungers 19. 19. A stripping plate 29. is reciprocally secured to the upper die plate 28. by a screw 30. through a slot 31. in each end of the stripping plate and has a plurality of holes 32. 32. of graduated diameters corresponding in size to and in axial alinement with the drawing holes 22. 22. in the upper die plate 28. when in position to coincide with the same. A whip spring 33.

is secured to the side of the frame 11. and has its free end engaging with the end of the stripping plate 29. to hold the stripping plate in its normal off-center position under spring tension. A horizontal shaft 34 is rotatably supported in the bearings 17, 17, and has a pinion 35 meshing with the rack 20 in the slide 18, and an enlarged end with transverse holes 36, 36; and a hand lever 37. extends through one of the transverse holes 36, as shown in Figs. 1 and 3.

The plungers 19. 19. vary in diameter one sixty-fourth of an inch, from the smallest which is preferably three-sixteenths of an inch, to the largest which is nine-sixteenths of an inch in diameter. All of the drawing holes 22. 22. in both die plates, are constructed to have their smallest diameter centrally between the top and bottom ends of the holes, as shown in Figs. 2., 5., 6., 7., and 8. The shallow depressions 25. 25. in the blank holding members 24. 24. vary in size for different size blanks, and a plurality of the blank holding members may be furnished with each press.

In the operation of the press, a sheet-metal blank 26. usually of gold and of the required size, is placed in the bottom depression 25. in the blank-holding member 24. and the same inserted into the slot 23. in a position for the end plunger 19. to enter the hole 27. in the blank-holding member. The hand lever 37. is then operated to move the slide 18. downward, through the operation of the shaft 34., the pinion 35. and the rack 20. In the downward movement of the plunger, as shown in Figs. 7. and 8., the end of the plunger passes through the slot 23., the hole 27. in the blank holding member 24. and engaging with the blank 26. forces the same downward through the drawing hole 22. thereby cupping the blank. As the blank is being cupped, as shown in Fig. 8., the edge of the blank is held from buckling or crimping, between the face of the depression 25. in the blank holding member, the bottom of the slot 23. and the upper edge of the drawing hole 22. until the blank is completely cupped. The cupped blank 38. is then placed on an upper plunger 19. of the required size, as shown in Fig. 5. and the hand lever 37. operated in the opposite direction, to move the slide 18. upward. The plunger forces the cupped blank upward through its corresponding drawing hole 22. and its corresponding hole 32. in the stripping plate 29. As the cupped blank 38. is forced through the hole 22., the stripping plate is moved to the left against the tension of the spring 33. On the complete upward movement of the plunger the stripping plate is moved back by the spring to bring the edge of the hole in the plate against the plunger and on the downward movement of the plunger the open end of the cupped blank catches on the edge of the hole in the plate and the blank is stripped from the plunger. These operations are repeated on the different plungers until the required size of crown shell is obtained.

It will be noted that two blanks of different sizes may be cupped simultaneously, the cupped blanks are held at their edges during the cupping process from crimping or buckling, thereby producing perfect cupped blanks, a plurality of the cupped blanks may be drawn down into crown shells simultaneously, and removing the crown shells manually from the plungers is dispensed with.

Having thus described my invention I claim as new and desire to secure by Letters Patent:—

1. A dental press, comprising a frame, guide-ways in the frame, a slide reciprocally supported in the guide-ways, a plurality of plungers of graduated diameters on each end of the slide, a die-plate supported by the frame adjacent each end of the slide, each die-plate having a plurality of drawing holes corresponding in size to and in axial alinement with the plungers, and means for reciprocating the slide.

2. A dental press, comprising a frame having a base and vertical guide-ways, a slide in the vertical guide-ways, a plurality of plungers of graduated diameters secured to the bottom of the slide, a die plate secured to the frame below the slide and having a plurality of drawing holes corresponding in size to and in axial alinement with the plungers and a transverse slot, a blank holding member in the slot, a plurality of plungers of graduated diameters secured to the top of the slide, a die plate secured to the frame above the slide and having a plurality of drawing holes corresponding in size to and in axial alinement with the upper plungers, and means for reciprocating the slide.

3. A dental press, comprising a frame, guide-ways in the frame, a slide in the guide-ways, a plurality of plungers of graduated diameters on the slide, a die plate secured to the frame and having a plurality of drawing holes corresponding in size to and in axial alinement with the plungers and an undercut slot extending over one of the drawing holes, a blank holding member having a sliding fit in the slot, a shallow depression in each face of said member and a central hole, and means for reciprocating the slide.

4. A dental press, comprising a frame, guide-ways in the frame, a slide in the guide-ways, a plurality of plungers of graduated diameters on the slide, a die plate secured to the frame and having a plurality of drawing holes corresponding in size to and in axial alinement with the plungers, a stripping plate having a plurality of holes corresponding in size to and in axial alinement with the drawing holes in the die plate, when in a position to coincide therewith, means for reciprocating the slide, and means for holding the stripping plate in an off-center position under spring tension.

5. A dental press, comprising a frame having a base and vertical guide ways, a slide in the guide ways, a plurality of vertical plungers of graduated diameters secured to the top of the slide, a die plate secured to the frame above the slide and having a plurality of drawing holes of graduated diameters corresponding in size to and in axial alinement with the plungers, a stripping plate reciprocally secured to the top of the die plate and having a plurality of holes of graduated diameter corresponding in size to and in axial alinement with the drawing holes in the die plate, when in a position to coincide therewith, means for holding the stripping plate in an off center position under spring tension, consisting of a spring secured to the frame and engaging with the stripping plate, and means for reciprocating the slide.

6. A dental press, comprising a frame having a base and vertical guide ways, a slide in the guide ways, a rack on the slide, a plurality of vertical plungers of graduated diameters secured to the top of the slide, a die plate secured to the frame above the slide and having a plurality of drawing holes of graduated diameters corresponding in size to and in axial alinement with the plungers, a stripping plate on the top of the die plate and having slots adjacent its ends and a plurality of holes of graduated diameters corresponding in size to and in axial alinement with the drawing holes in the die plate, when in a position to coincide therewith, screws extending through the slots in the stripping plate into the die plate, a spring secured to the frame and engaging with the stripping plate, a shaft rotatably supported in bearings on the frame, a pinion on the shaft meshing with the rack on the slide, an enlarged end on the shaft, and a hand lever extending through a transverse hole in the enlarged end of the shaft.

7. A dental press, comprising a frame having a base, and vertical guide ways, a slide in the guide ways, a rack on the back of the slide, a plurality of vertical plungers of graduated diameters secured to the bottom of the slide, a die plate secured to the frame below the slide and having a plurality of drawing holes corresponding in size to and in axial alinement with the plungers and an undercut transverse slot, a blank holding member having a sliding fit in the slot, a circular shallow depression in each face of said member and a central hole, a shaft rotatably supported in bearings on the back of the frame, a pinion on the shaft meshing with the rack on the slide, an enlarged end on the shaft, and a detachable hand lever extending through a transverse hole in the enlarged end of the shaft.

8. A dental press, comprising a vertical frame having a base and vertical guideways, a slide in the guide-ways, a rack on the back of the slide, a plurality of vertical plungers of graduated diameters secured to the bottom of the slide, a horizontal die-plate secured to the frame below the slide and having a plurality of drawing holes corresponding in size to and in axial alinement with the plungers and an undercut transverse slot, a blank holding member having a sliding fit in the slot, a circular shallow depression in each face of said member and a central hole, a plurality of vertical plungers of graduated diameters secured to the top of the slide, a horizontal die-plate secured to the frame above the slide and having a plurality of drawing holes of graduated diameters corresponding in size to and in axial alinement with the plungers, a stripping plate on the top of the die-plate and having slots adjacent its ends and a plurality of holes of graduated diameters corresponding in size to and in axial alinement with the drawing holes in the die-plate, when in a position to coincide therewith, screws extending through the slots in the stripping plate into the die-plate, a spring secured to the frame and engaging with the stripping plate, a shaft rotatably supported in bearings on the back of the frame, a pinion on the shaft meshing with the rack on the slide, an enlarged end on the shaft, and a hand lever extending through a transverse hole in the enlarged end of the shaft.

In testimony whereof, I have signed my name to this specification in the presence of two subscribing witnesses.

FERNANDO OSCAR JAQUES, JR.

Witnesses:
ANTHONY V. PETTINE,
CHAS. H. LUTHER.

Copies of this patent may be obtained for five cents each, by addressing the "Commissioner of Patents, Washington, D. C."